United States Patent
Otake

(10) Patent No.: US 7,239,433 B2
(45) Date of Patent: Jul. 3, 2007

(54) IMAGE READING APPARATUS

(75) Inventor: Masaki Otake, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 10/355,106

(22) Filed: Jan. 31, 2003

(65) Prior Publication Data

US 2003/0169464 A1    Sep. 11, 2003

(30) Foreign Application Priority Data

Feb. 1, 2002    (JP) .............................. 2002-026057

(51) Int. Cl.
*H04N 1/04* (2006.01)
(52) U.S. Cl. ...................... 358/474; 358/1.2; 358/1.15; 358/409; 358/1.9; 358/412; 348/211.5; 348/335; 382/167; 382/154
(58) Field of Classification Search ................ 358/474, 358/501, 528, 1.2, 3.27, 475, 509, 1.15, 409–412, 358/1.9; 348/335, 211.5; 382/167, 154
See application file for complete search history.

(56) References Cited

U.S. PATENT DOCUMENTS

| | | | |
|---|---|---|---|
| 5,541,645 A * | 7/1996 | Davis | 348/96 |
| 5,818,527 A * | 10/1998 | Yamaguchi et al. | 348/335 |
| 5,920,063 A * | 7/1999 | Kawamoto et al. | 250/208.1 |
| 6,724,473 B2 * | 4/2004 | Leong et al. | 356/237.2 |
| 6,947,084 B2 * | 9/2005 | Kaifu et al. | 348/247 |
| 6,965,410 B1 * | 11/2005 | Yamagishi | 348/362 |
| 6,977,677 B1 * | 12/2005 | Shinohara | 348/211.5 |
| 2003/0107784 A1 * | 6/2003 | Togashi | 358/528 |

FOREIGN PATENT DOCUMENTS

| JP | 9-247394 | 9/1997 |
|---|---|---|
| JP | 2000-307852 | 11/2000 |

* cited by examiner

*Primary Examiner*—Douglas Q. Tran
*Assistant Examiner*—Negussie Worku
(74) *Attorney, Agent, or Firm*—Fitzpatrick, Cella, Harper & Scinto

(57) ABSTRACT

An image reading apparatus which includes a timing adjusting circuit for adjusting a generation timing of a drive signal for driving at least an image pickup element which reads an object image and outputs an image signal of the object image, a memory circuit for storing an adjustment value of the generation timing of the drive signal adjusted by the timing adjusting circuit, and a drive signal generating circuit for generating the drive signal in accordance with the adjustment value stored in the memory circuit.

11 Claims, 10 Drawing Sheets

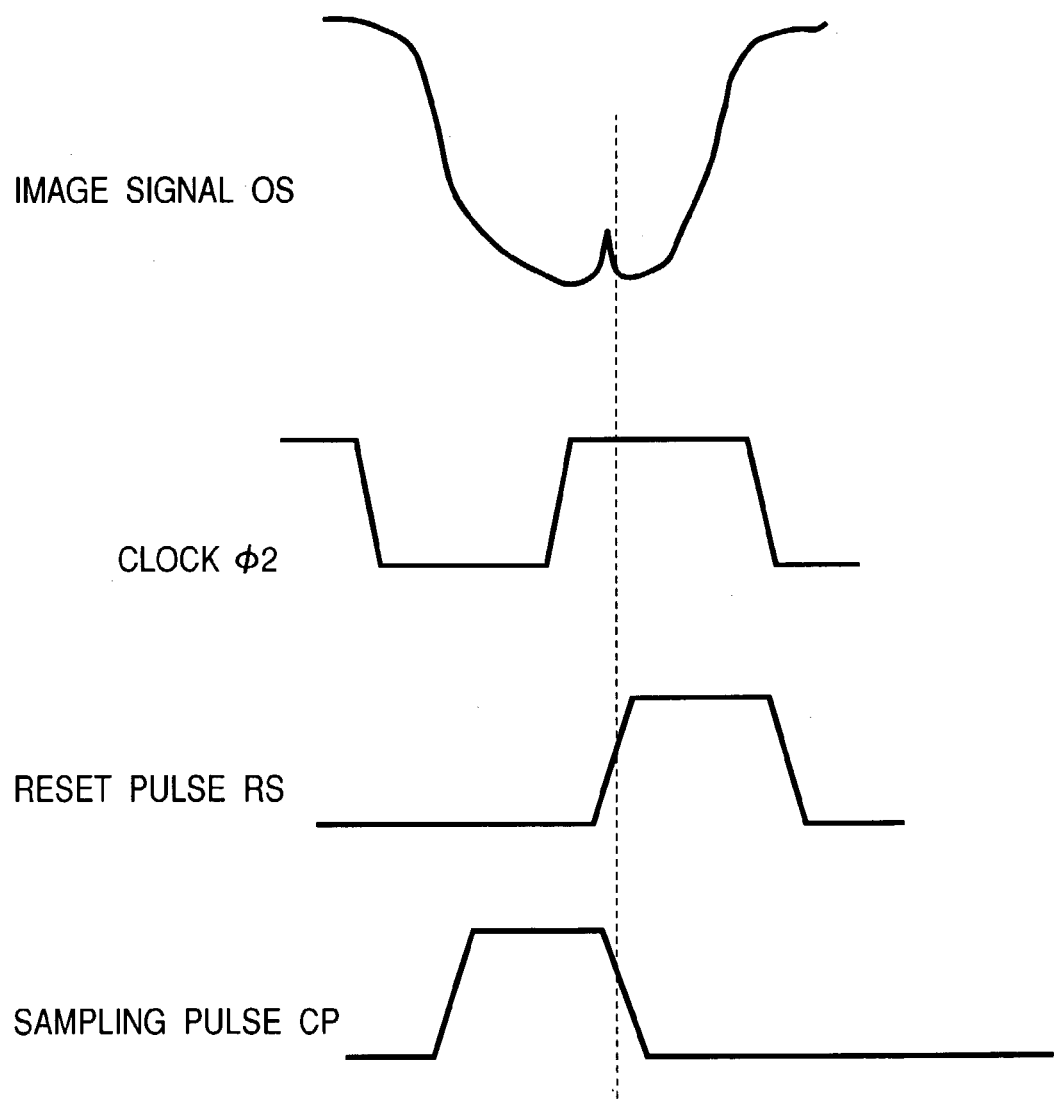

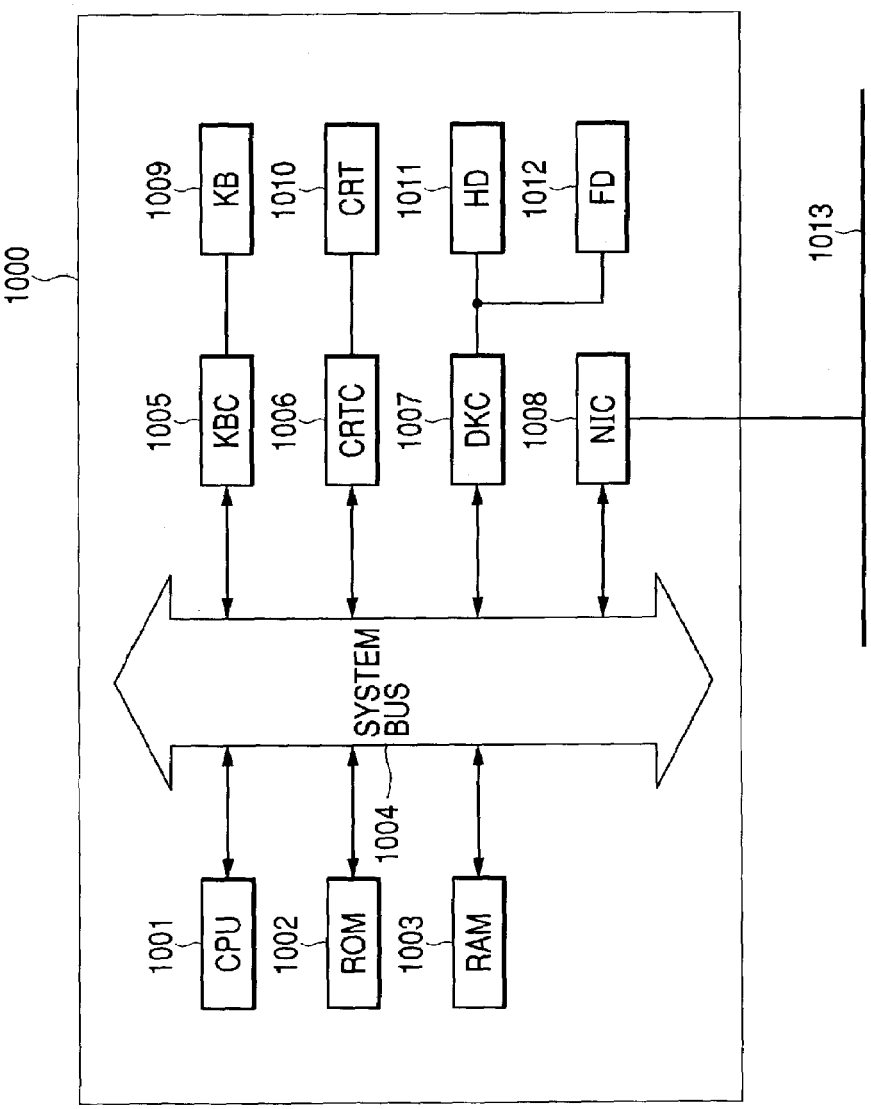

IMAGE READING APPARATUS

BACKGROUND OF THE INVENTION

1. Field of the Invention

The present invention relates to an image reading apparatus, a driving method of the image reading apparatus, a storage medium and a program, and more particularly to the technique suitable for use with an image reading apparatus, which uses a CCD as an image pickup element and can selectively change a reading resolution.

2. Related Background Art

FIG. 6 is a cross sectional view showing an example of the whole structure of a copying machine constituted of an image reading unit (image reading apparatus) 136 and an image forming apparatus unit (image forming apparatus) 100.

As shown in FIG. 6, the image forming apparatus unit 100 is a removable cartridge in which a photosensitive drum 110, a roller charger 134, and a cleaner box 133 for accumulating waste toner, toner and a toner container are integrated. The cartridge is replaced by a new one when the number of printed sheets reaches a predetermined number. Above the image forming unit 100, a laser diode 104 constituting an exposure unit, a polygon mirror 105 to be rotated by a high speed motor not shown, lenses 106 and 107 and a turnback mirror 108 are arranged. The roller charger 134 is supplied with an A.C. voltage at a frequency of several hundreds Hz superposed upon a D.C. voltage, and the photosensitive drum 110 is uniformly charged by the roller charger 134.

The laser diode 104 emits a laser beam in response to image information (image signal) supplied from the image reading unit 136 or an external apparatus such as a personal computer. The output laser beam is applied to the photosensitive drum 110 via an optical path (polygon mirror 105, lenses 106 and 107 and turnback mirror 108). As the photosensitive drum 110 rotates in the arrow direction shown in FIG. 6, an image corresponding to the image information is visualized with developing toner coated by a developer sleeve 109.

The toner image on the photosensitive drum 110 is transferred to a transfer sheet 150 by a transfer roller 135 in accordance with a voltage across the photosensitive drum 110 and transfer roller 135 supplied from a high voltage source not shown. This transfer sheet 150 is supplied from a cassette 131 housed in the image forming unit 100 or a cassette 132 on a sheet feeding deck 101 (an optional unit for newly installing a cassette other than the cassette 131).

The transfer sheet 150 onto which the toner image is transferred is transported by a transport roller 116 to a well-known fixing unit 111 for heating and pressing the transfer sheet. The transferred toner still not fixed is melted and fixed by the fixing unit 111 to be ejected out on a face-down tray (image directed downward) 113. In this manner, an image corresponding to the supplied image information can be obtained. Toner not transferred to the transfer sheet 150 by the transfer roller 135 and left on the photosensitive drum 110 is removed through cleaning by a well-known fur brush, blade or the like.

The image reading unit 136 acquires image data of an original image. In the image reading unit 136, lamps 137 and 138 apply light to an original. Reflected light is focused on CCDs 139 and 140 by using an optical system such as a lens and mirrors to photoelectrically convert an optical image into digital image data of each line. A reading unit in which the lamps 137 and 138, the optical system such as a lens and mirrors and CCDs 139 and 140 are integrated is driven along a sub-scan direction (direction perpendicular to the line) to read the image of one page and obtain digital image data of the original image. Reference numeral 141 denotes a carriage for moving the reading unit in parallel to the original base while always maintaining a constant distance from the original surface.

FIG. 7 is a block diagram showing the conventional structure of CCD and its peripheral circuits arranged in the carriage 141.

Referring to FIG. 7, light irradiated from the lamp 138 and then reflected from the original 142 is focused on CCD 140 via a mirror 143 and a lens 144. A timing generation circuit 145 generates drive signals (CCD drive signals ø1, ø2, SH and RS) at predetermined timings and supplies them to a CCD driving circuit 146. In response to the CCD drive signals ø1, ø2, SH and RS, the CCD driving circuit 146 drives CCD 140. CCD 140 outputs an image signal OS obtained through photoelectric conversion of light reflected from the original 142.

FIG. 8 is a timing chart of CCD driving.

In FIG. 8, ø1 and ø2 are clock signals used for transferring charges accumulated in accordance with incident light (reflected light) in photodiode array arranged in an in CCD. RS is a reset pulse used for injecting charges transferred by the clock signals ø1 and ø2 into a floating capacitor provided in an output unit of the CCD. OS is an image signal that is output from a source follower constituted of MOS transistors, in accordance with a potential changed with the charges injected into the floating capacitor.

As shown in FIG. 8, charges accumulated in each photodiode of CCD are sequentially transferred by using the clock signals ø1 and ø2 and injected into the floating capacitor in response to the reset pulse RS. A change in the potential caused by the injection of charges into the floating capacitor is output as the image signal OS from the source follower.

In the conventional image reading apparatus described above, the drive signals for driving functional units of the image reading apparatus may adversely affect the image signal depending upon the generation (output) timings (a timing signal generating method) of the drive signals, because of a variation in characteristics of floating capacitors of CCDs caused by a manufacture variation. Therefore, moire may be formed in a formed image depending upon a half-tone input pattern of the original image. Namely, in the state that CCD operates at highest speed, drive signals influence the output image signal in some case depending upon the transfer speed and floating capacitor.

For example, as shown in FIG. 9, if CCD is driven at a highest operation speed with clock signals, in order to improve an SN ratio it is necessary to set the timing for sampling the image signal OS near at the trailing edge of one period of a transfer clock signal in order to hold a peak level of the image signal. The reset pulse RS for injecting charges transferred to the CCD output into the floating capacitor is also required to be set near at the trailing edge of one period of the clock signal.

In the conventional image reading apparatus, however, the drive signals are generated at fixed timings so that the set-up time and hold time of each drive signal or the like is very critical. If there is a variation in characteristics of floating capacitors caused by a manufacture variation, crosstalks or the like to the image signal OS occur at the timing when the reset pulse RS is enabled and a sampling pulse CP of the image signal OS is disabled, which may result in an inability to read an image correctly.

SUMMARY OF THE INVENTION

It is an object of the invention to prevent interference of drive signals upon an image signal to be output from an image pickup element.

In order to achieve the above object of the invention, an aspect of the present invention presents an image reading apparatus which comprises: a timing adjusting circuit which adjusts generation a timing of a drive signal for driving at least an image pickup element which reads an object image and outputs an image signal of the object image; a memory circuit which stores an adjustment amount of the generation timing of the drive signal adjusted by the timing adjusting circuit; and a drive signal generating circuit which generates the drive signal in accordance with the adjustment amount stored in the memory circuit.

Other objects and features of the present invention will become more apparent from the following description taken in conjunction with the accompanying drawings.

BRIEF DESCRIPTION OF THE DRAWINGS

FIG. 9 is a diagram illustrating conventional abnormal image generation.

FIG. 10 is a block diagram showing an example of the structure of a computer capable of realizing an image processing apparatus.

DESCRIPTION OF THE PREFERRED EMBODIMENTS

Embodiments of the invention will be described with reference to the accompanying drawings.

FIRST EMBODIMENT

Figure 1:
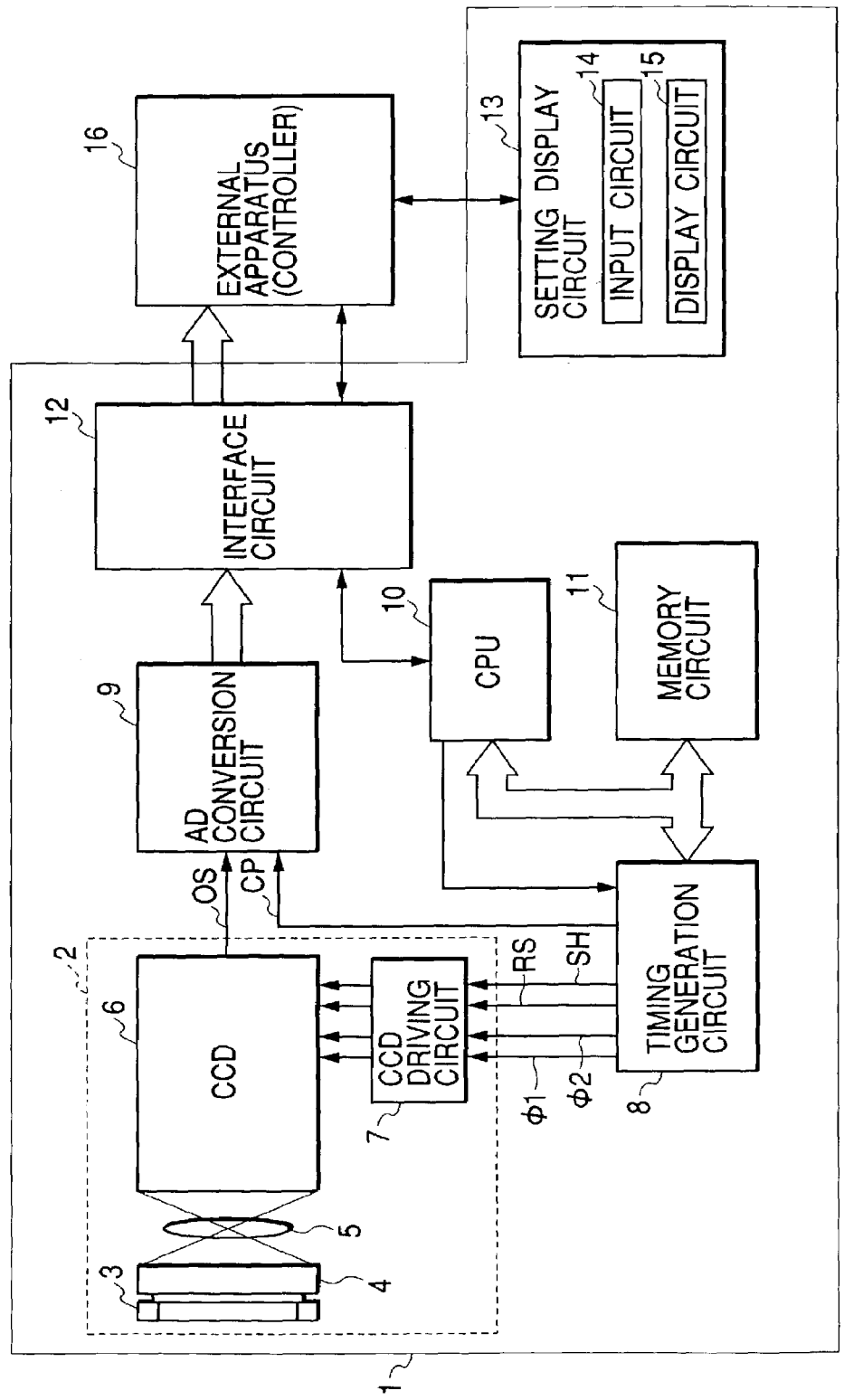
FIG. 1 is a block diagram showing an example of the structure of an image reading apparatus according to a first embodiment of the invention.

FIG. 1 is a block diagram showing an example of the structure of an image reading apparatus according to a first embodiment of the invention. The image reading apparatus 1 of the first embodiment has a plurality of reading modes having different original reading resolutions, which modes can be selected from an input circuit 14 to be described later or an external apparatus 16 connected via an interface circuit 12.

Referring to FIG. 1, a carriage 2 has a lamp 3, a lens 5, a CCD (image pickup element) 6 and a CCD driving circuit 7. In FIG. 1, for the purpose of description simplicity, an original 4 to be read is shown in the carriage 2.

The lamp 3 applies light to the original. 4. The lens 5 focuses (converges) light reflected from the original 4 upon CCD 6. CCD 6 photoelectrically converts reflection light from the original 4, corresponding to the darkness and brightness of the image of the original 4, into an image signal OS which is an analog electric signal corresponding to the image information of the original 4. The CCD driving circuit 7 processes CCD drive signals ø1, ø2, RS and SH generated by the timing signal generation circuit 8 and supplies them to CCD 6.

The timing generation circuit 8 generates the CCD drive signals ø1, ø2, RS, SH and a sampling pulse CP and supplies them to the CCD driving circuit 7 and an A/D conversion circuit 9. Of the CCD drive signals, signals ø1 and ø2 are clock signals for phase-driving a photodiode array arranged in CCD 6 to sequentially transfer the accumulated charges corresponding to reflection light of the original 4 to an output unit of CCD 6. SH is a transfer signal for transferring signals to a shift register. RS is a reset pulse used for injecting charges transferred to the output unit into a floating capacitor provided in the output unit of CCD 6 to thereby output an image signal OS corresponding to the charges to an external (A/D conversion circuit 9).

The A/D conversion circuit 9 samples the image signal OS (analog signal) output from CCD 6 and converts it into image data (digital signal), in response to the sampling pulse CP supplied from the timing generation circuit 8. A CPU 10 transfers information of command, status and the like via an interface circuit 12 to and from an external apparatus 16 such as an image reading apparatus controller. CPU 10 controls the timing generation circuit 8 by rewriting an adjustment value stored in a memory circuit 11 or reading out an already-adjusted value stored in the memory circuit 11 and setting (adjusting) the generation (output) timing of the drive signal of the timing generation circuit 8 in accordance with the read adjustment value. CPU 10 supplies status information or the like to a setting display circuit 13 and receives setting information entered from the setting display circuit 13.

The memory circuit 11 is a non-volatile memory circuit that stores the adjustment value of the generation timing of drive signal at the timing generation circuit 8. The memory circuit 11 also stores a standard adjustment value as a default initial value. If the timing of the timing generation circuit 8 is adjusted when the image reading apparatus 1 is assembled in a factory, this adjustment value is stored in the memory circuit 11.

The interface circuit 12 is used for transmitting image data to the external apparatus 16 and transferring data to and from the external apparatus 16. The external apparatus 16 is an image reading apparatus controller and the like. The external apparatus 16 communicates with the image reading apparatus 1 to set a read command and a reading mode (reading resolution), to process an image signal supplied from the image reading apparatus 1 and to compress or expand data supplied from the image reading apparatus 1.

The setting display circuit 13 includes an input circuit 14 for setting a reading mode and the like of the image reading apparatus 1 and a display circuit 15 for displaying the status (operation, setting state and the like) of the image reading apparatus 1.

Next, the operation of the image reading apparatus will be described.

In the operation of the image reading apparatus 1 of the first embodiment, the normal reading operation performed after the generation timings of the drive signals (the CCD drive signals ø1 and ø2, RS and SH and the sampling pulse CP) generated by the timing generation circuit 8 are adjusted, is the same as that of a general image reading apparatus excepting that the image reading apparatus operates by using the CCD drive signals generated at the adjusted timings, and so the description of the normal reading operation is omitted.

The operation of adjusting the generation timing of the drive signal will be described in detail with reference to FIG. 2. The operation of adjusting the generation timing of the drive signal is performed for each of image reading apparatuses to be shipped from the factory.

Figure 2:
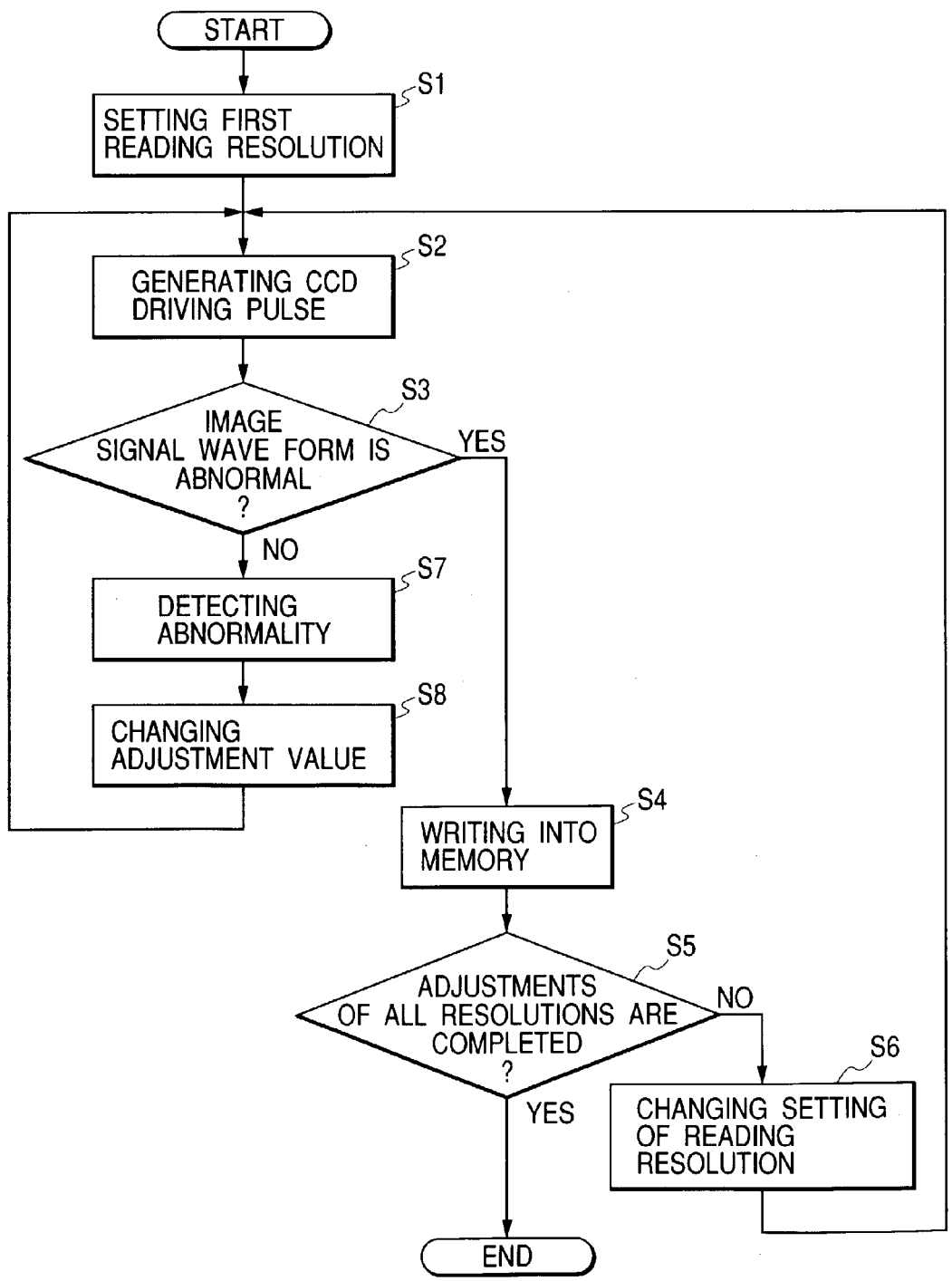
FIG. 2 is a flow chart illustrating the operation of adjusting timings for generating drive signals of the image reading apparatus of the first embodiment.

FIG. 2 is a flow chart illustrating the operation of adjusting a timing when drive signal of the image reading apparatus 1 of the first embodiment is generated.

The operation of adjusting the generation timing of the drive signal at the timing generation circuit 8 is performed not in a normal readable state (normal operation mode) but in an adjustment state (adjustment mode) by an assembly worker.

An assembly worker sets the image reading apparatus 1 to the adjustment mode, and sets the reading resolution (reading mode) of the image reading apparatus 1 to an arbitrary first reading resolution. CPU 10 reads out from the memory circuit 11 the standard adjustment value to be used for generating the drive signal corresponding to the set reading resolution (Step S1).

In accordance with the adjustment values (inclusive of standard adjustment value), CPU 10 sets the generation timings of the drive signals at the timing generation circuit 8. In accordance with the set adjustment values, the timing generation circuit 8 generates the drive signals (Step S2).

Next, it is checked whether the waveform of the image signal OS output from CCD 6 in accordance with the CCD drive signals generated at Step S2 is abnormal or not (Step S3).

If it is judged in Step S3 that the image signal OS is influenced by crosstalks or the like caused by the drive signals (sampling pulse CP and reset pulse RS) (Step S7), then the generation timing of the reset pulse RS is adjusted to delay the effective timing of the reset pulse RS. The adjustment value is a difference from the standard adjustment value, namely, the reset pulse RS at the timing generation circuit 8 is adjusted by the adjustment value representative of the generation timing relative to the generation timing of the reset pulse RS corresponding to the standard adjustment value (Step S8).

The flow returns to Step S2 whereat the drive signals are generated at the adjusted generation timings and it is checked whether the waveform of the corresponding image signal OS is abnormal or not. If it is judged that any influence of the drive signals exists on the image signal OS, the adjustment value is further increased to perform Steps S2, S3, S7 and S8 until the influence of the sampling pulse CP and reset pulse RS does not affect the image signal OS.

If it is judged in Step S3 that the image signal OS is not influenced by crosstalks or the like caused by the drive signals, the final adjustment values of the generation timings are written in the memory circuit 11 (Step S4). If the adjustment values are changed not at all, the adjustment values already stored in the memory circuit 11 are retained without change.

Next, it is checked whether the generation timing adjustment of the drive signal is completed for all reading resolutions presented by the image reading apparatus 1 (Step S5). If there is a reading resolution for which the timing adjustment is still not performed, this reading resolution is set (Step S6) to repeat the above-described operation. If the generation timing adjustment is completed for all reading resolutions, the process is terminated.

As described above in detail, according to the first embodiment, the image reading apparatus 1 is provided with: CPU 10 for adjusting the generation timing of the reset pulse RS which is one of the CCD drive signals used for driving CCD 6; the memory circuit 11 for storing the adjustment value of the generation timing of the reset pulse RS; and the timing generation circuit 8 for generating the CCD drive signals including the reset pulse RS and the sampling pulse CP at the generation timings determined by the adjustment values stored in the memory circuit 11. It is therefore possible to adjust the generation timing of the timing generation circuit 8 of each image reading apparatus.

It is therefore possible to generate an optimum drive signal of each image reading apparatus and prevent the influence of interference such as crosstalks of drive signals upon the image signal OS to be output from CCD 6. It is possible to reliably prevent CCD 6 from outputting the image signal OS or image data corresponding to the image signal OS which produces an abnormal image such as a moire image. An original image can therefore be read with high quality.

Since the adjustment value of the generation timing is stored in the non-volatile memory circuit 11, the generation timing can be re-adjusted easily by reading the already adjusted value stored in the memory circuit 11 when the functional unit other than CCD 6 such as a light source is replaced by a new one because of any failure after shipment (in a market or at a user). The work burden (man power and time) required for the adjustment can be mitigated.

In the generation timing adjustment of the first embodiment, although the generation timing of the reset pulse RS is delayed, the generation timing of the sampling pulse CP may be advanced. The relative generation timings of the reset pulse RS and sampling pulse CP may be adjusted by adjusting both the pulses RS and CP.

The duty ratios of the clock signals ø1 and ø2 may be adjusted to adjust the generation timing of the reset pulse RS.

In the first embodiment, the generation timing adjustment of the drive signals of the timing generation circuit 8 is performed for all reading resolutions presented by the image reading apparatus 1. Instead, the generation timing adjustment of the timing generation circuit 8 may be performed only for the reading resolution near at the highest operation frequency of CCD 6. In this case, the adjustment values obtained by the generation timing adjustment of the timing generation circuit 8 only for the reading resolution near the highest operation speed are stored in the memory circuit 11 so that the capacity of the memory circuit 11 for storing the adjustment values can be reduced.

SECOND EMBODIMENT

Next, the second embodiment will be described.

Figure 3:
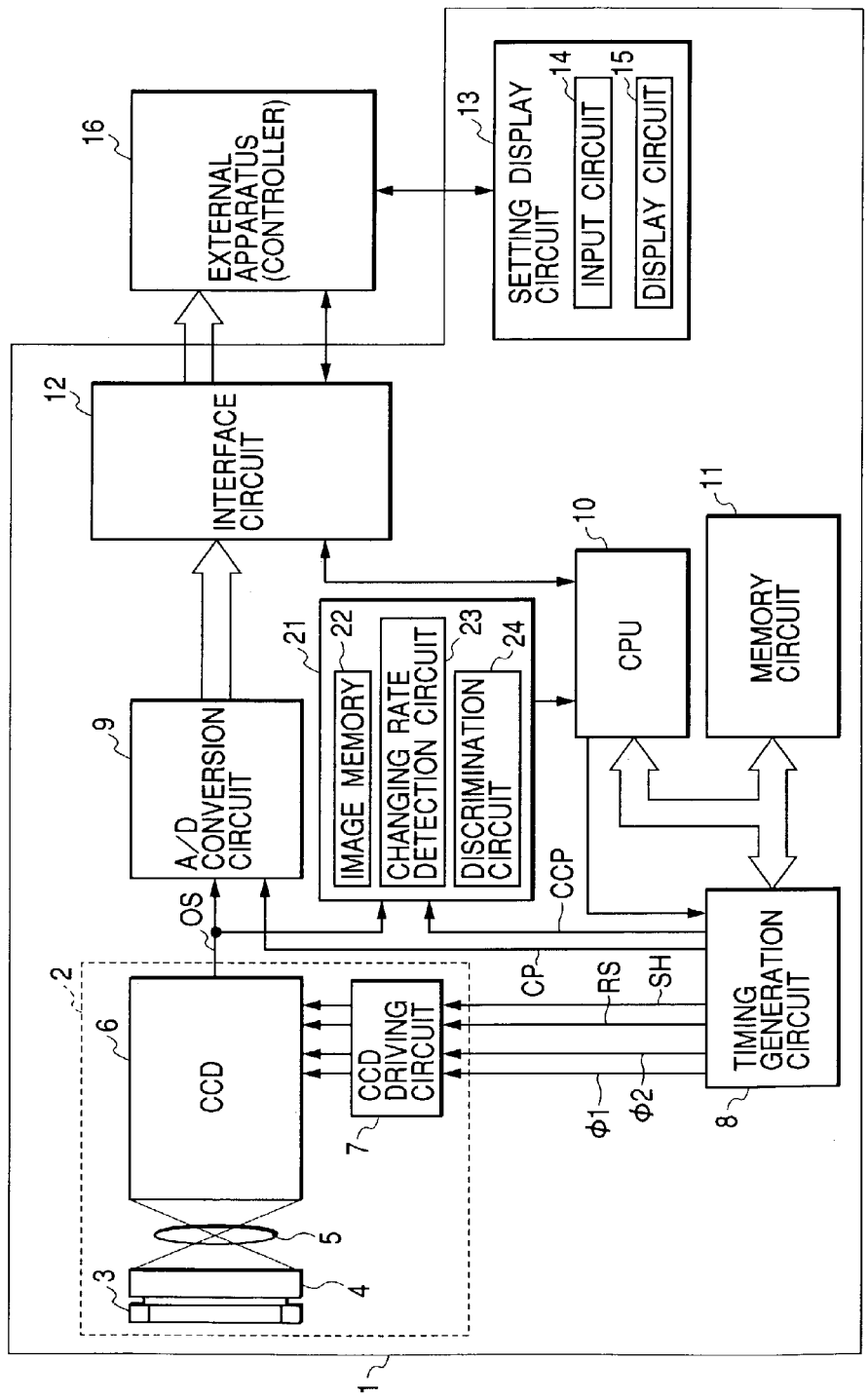
FIG. 3 is a block diagram showing an example of the structure of an image reading apparatus according to a second embodiment of the invention.

FIG. 3 is a block diagram showing an example of the structure of an image reading apparatus according to the second embodiment of the invention. In FIG. 3, blocks or the like having the same functions as those of the blocks or the like shown in FIG. 1 are represented by identical reference symbols and the duplicate description thereof is omitted.

Referring to FIG. 3, an image data abnormality detection circuit 21 is constituted of an image memory 22, a changing rate detection circuit 23 and a discrimination circuit 24. The image data abnormality detection circuit 21 checks whether there is continuity of the output levels of the image signal OS in the main scan direction. In practice, the image data abnormality detection circuit 21 is constituted of an A/D converter, an image memory, a divider circuit, a comparator and the like.

The image memory 22 temporarily stores digital image data obtained by converting the image signal OS by the A/D conversion circuit (not shown) in the image data abnormality detection circuit 21. In accordance with the image data stored in the image memory 22, the changing rate detection circuit 23 calculates a changing rate of the image data of one pixel. The discrimination circuit 24 judges whether the changing rate of the image data in one pixel calculated by the changing rate detection circuit 23 is in a predetermined range, and supplies the judgment result to CPU 10.

The period of sampling the image signal OS generally corresponds to the period of sampling each pixel. In contrast, when the abnormality of the image signal OS is checked by the image data abnormality detection circuit 21, the sampling period is shortened to increase the number of sampling points of the image signal OS in order to check the level change in the image signal OS of one pixel.

The output level of the image signal OS generally increases gradually from start of transfer and decreases after the reset pulse RS is enabled. During the period from when the sampling pulse CP is enabled to when the reset pulse RS is enabled, the image data abnormality detection circuit 21 detects the presence of any abnormality of the image signal OS by sampling the image signal OS in response to intra-pixel pulses CCP.

Next, with reference to FIGS. 4 and 5, the image data abnormality detection operation will be described.

Figure 4:
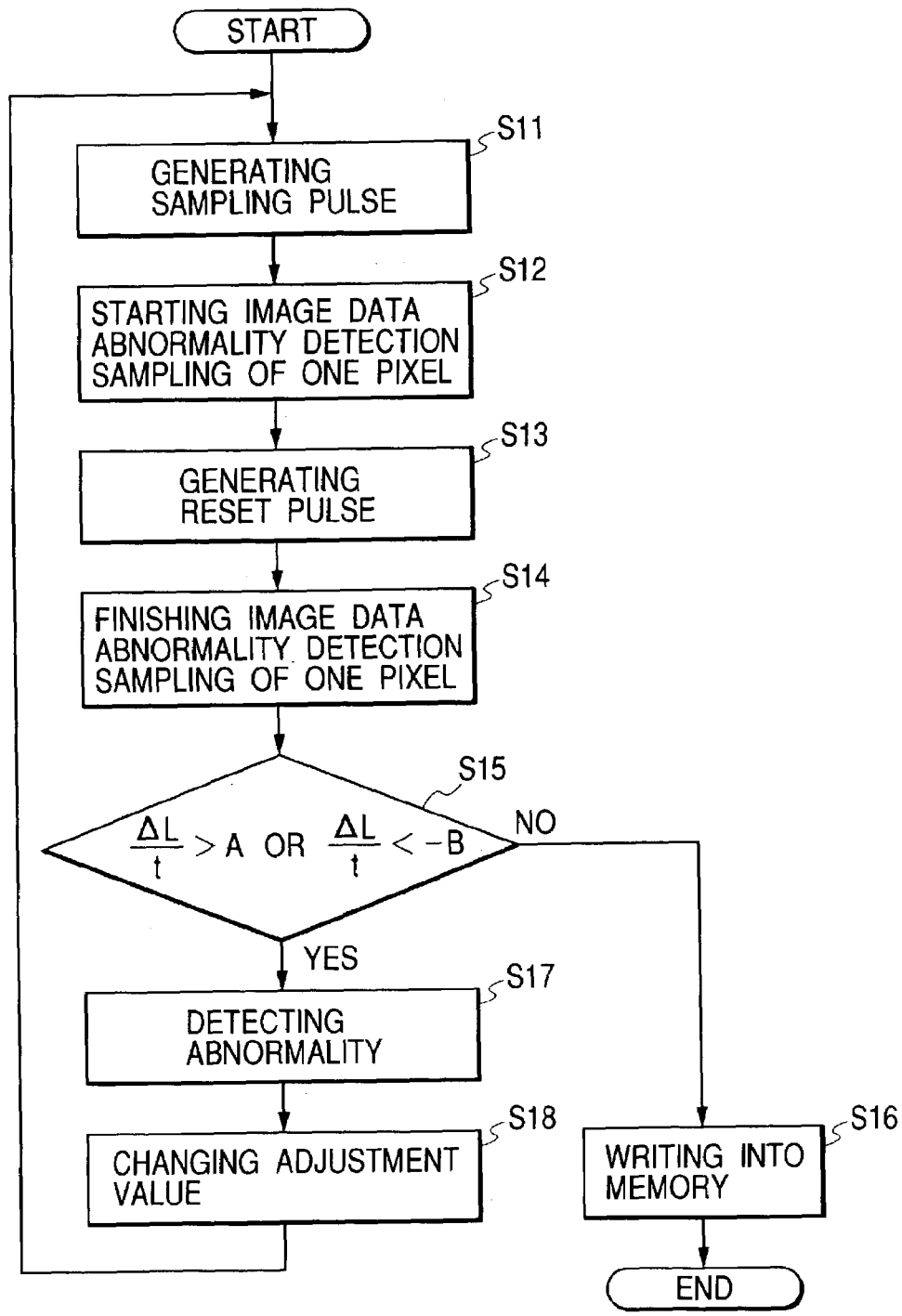
FIG. 4 is a flow chart illustrating an abnormal image data detection operation of the image reading apparatus of the second embodiment.
Figure 5:
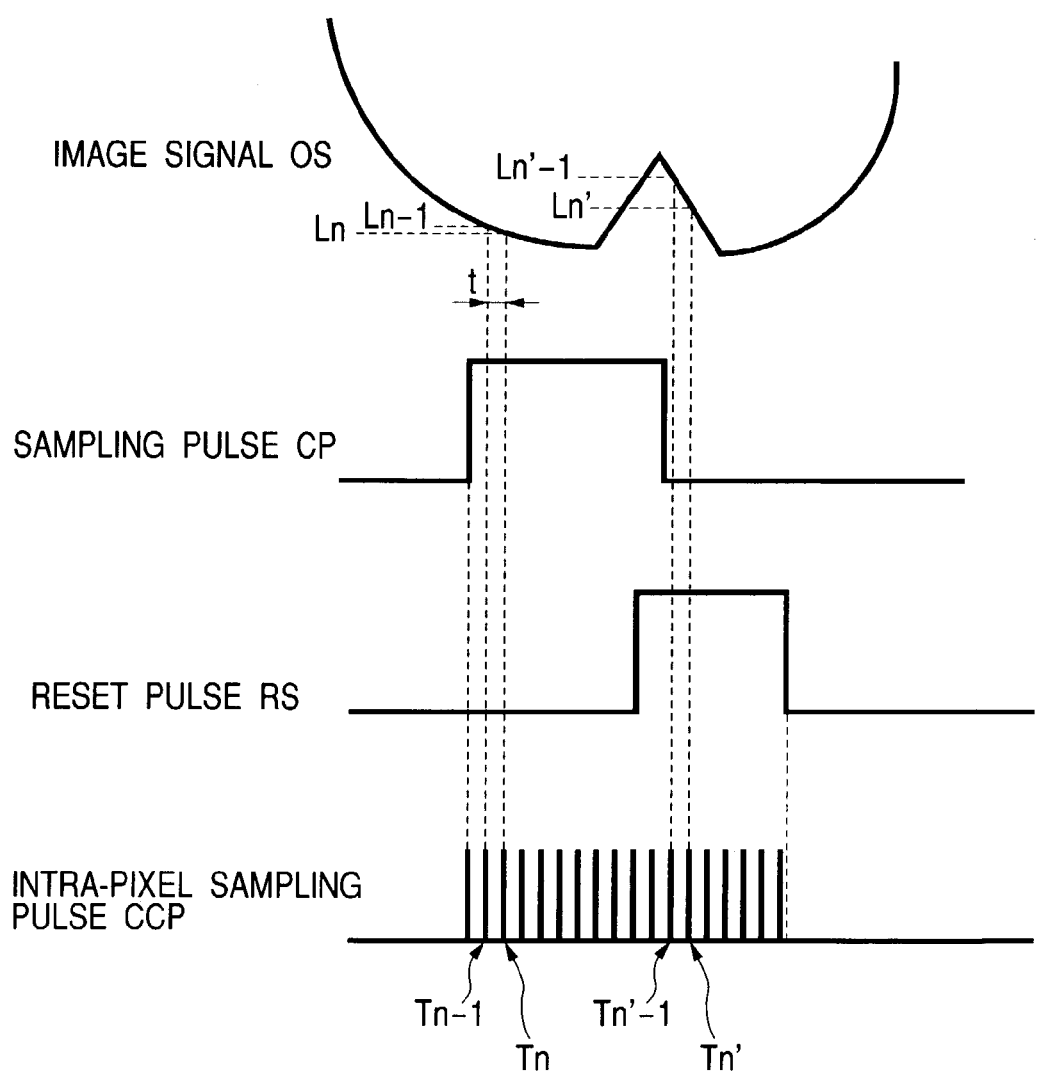
FIG. 5 is a diagram illustrating abnormal image detection according to the second embodiment.
Figure 6:
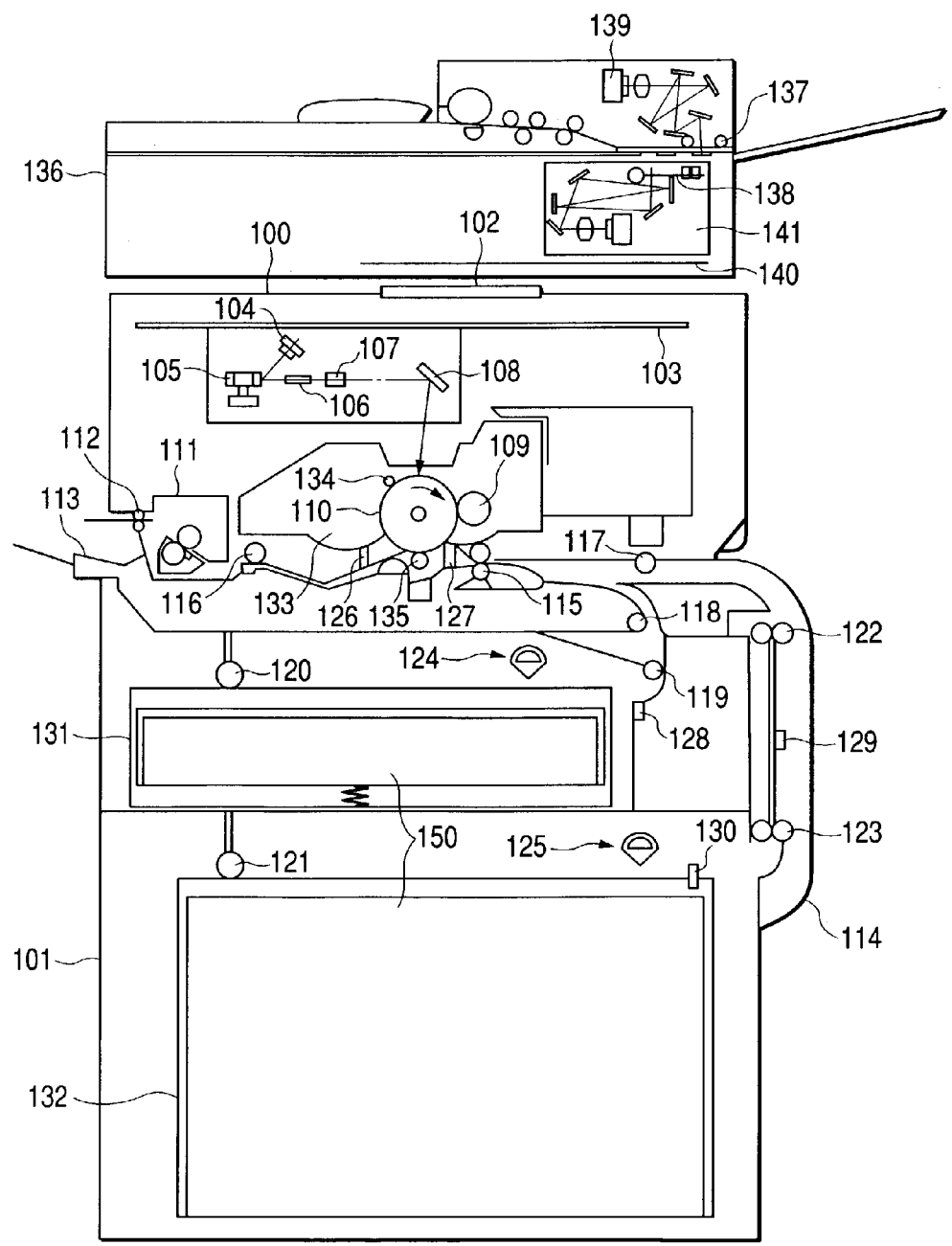
FIG. 6 is a diagram showing an example of the structure of a copying machine constituted of an image reading apparatus and an image forming apparatus.
Figure 7:
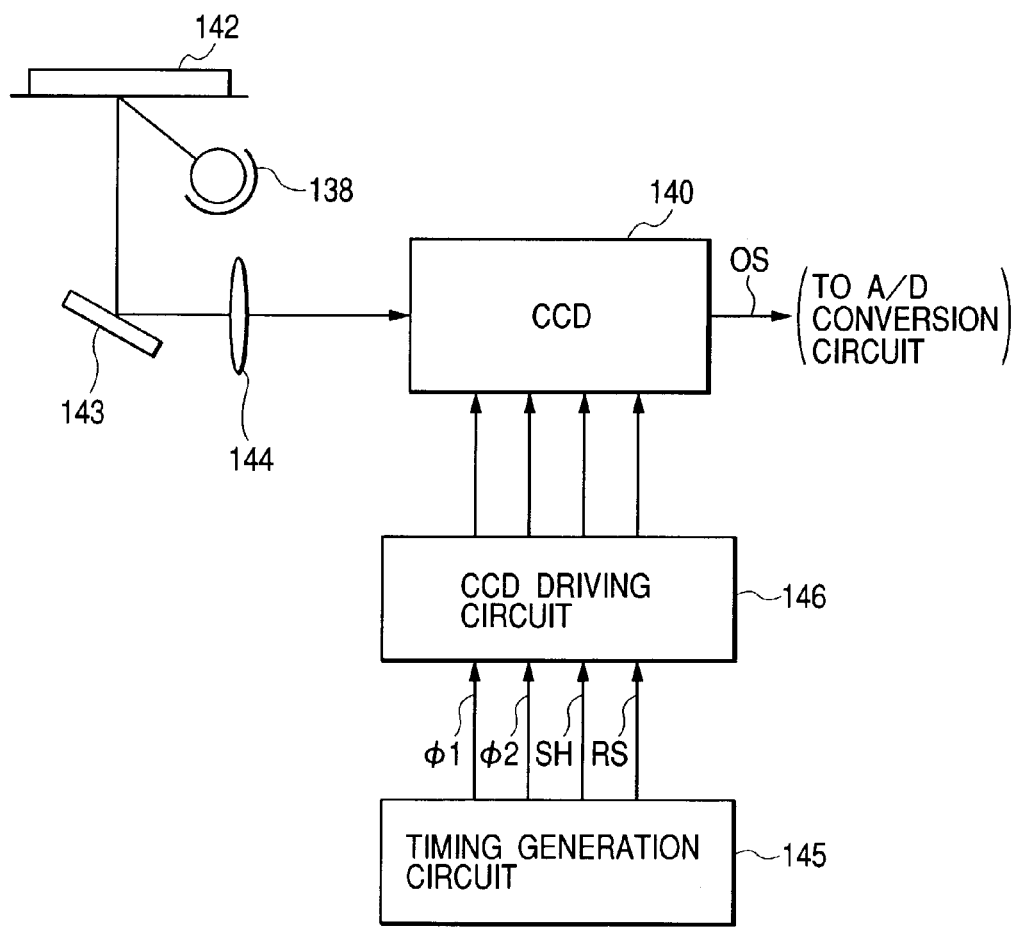
FIG. 7 is a block diagram showing the conventional structure of a CCD and its peripheral circuits.
Figure 8:
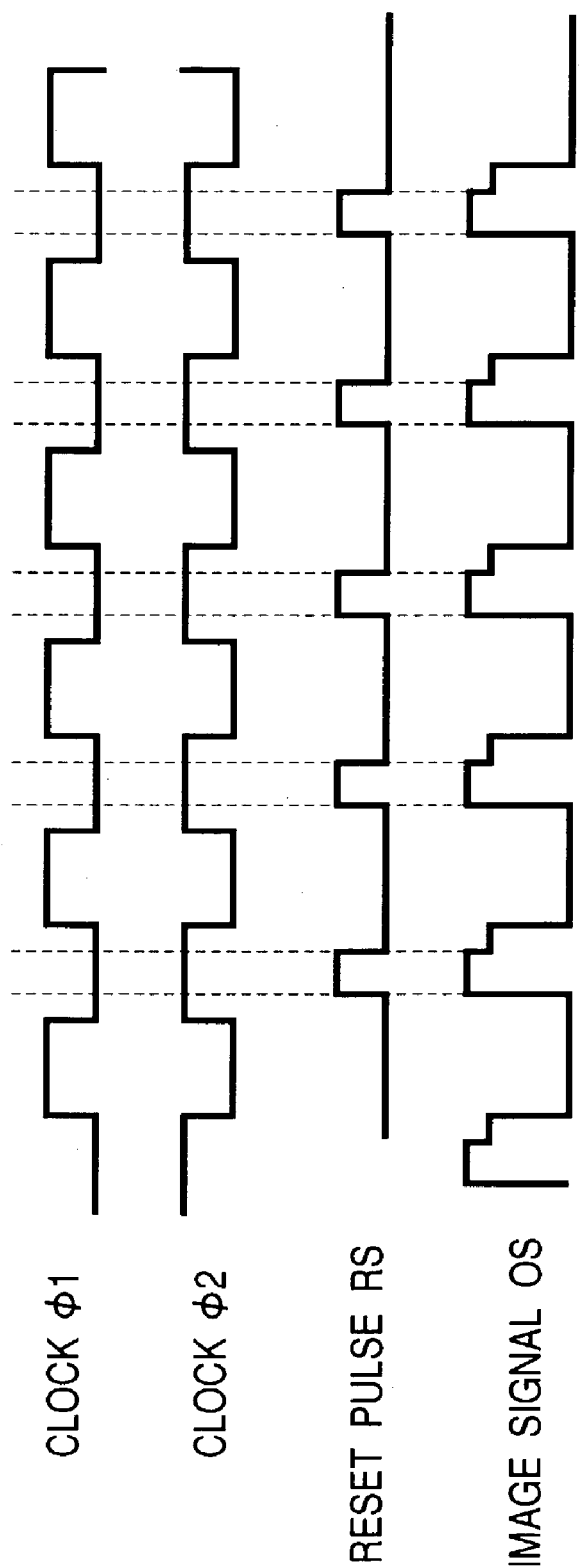
FIG. 8 is a timing chart illustrating a conventional method of driving a CCD.

FIG. 4 is a flow chart illustrating an abnormal image data detection operation of the image reading apparatus 1 of the second embodiment.

When the sampling pulse CP for sampling the image signal OS is generated by the timing generation circuit 8 (Step S11), the image data abnormality detection circuit 21 starts storing the image signal OS in the image memory 22 in order to detect image data abnormality in response to an intra-pixel sampling pulse CCP having a short period (Step S12). The intra-pixel sampling pulse CCP is supplied from the timing generation circuit 8.

Thereafter, when the reset pulse RS generated by the timing generation circuit 8 is enabled (Step S13), the image data abnormality detection circuit 21 stops storing the image signal OS in the image memory 22 to be used for detecting image data abnormality (Step S14).

Next, the changing rate detection circuit 22 calculates a level difference $\Delta L$ between adjacent image data stored in the image memory 22 at the sampling period $t(=T_n-T_{n-1})$. $\Delta L=L_n-L_{n-1}$ where $L_{n-1}$ is the image data level at $T_{n-1}$ and $L_n$ is the image data level at $T_n$. The discrimination circuit 24 judges whether the image data level difference $\Delta L$ calculated by the changing rate detection circuit 22 satisfies $(\Delta L/t)>A$ or $(\Delta L/t)<-B$ at any point in the whole sampling period, where A and B are predetermined values (Step S15).

If the judgement results indicate that the image data level difference $\Delta L$ does not satisfies $(\Delta L/t)>A$ nor $(\Delta L/t)<-B$ during the whole sampling period (No at Step S15), it is judged that abnormality does not exist in the image signal OS and the image data abnormality detection operation is terminated without adjusting the timing of the sampling pulse CP to retain the default values (standard adjustment values) as the adjustment values.

If the judgment results at Step S15 indicate that the image data level difference $\Delta L$ does not satisfy $(\Delta L/t)>A$ nor $(\Delta L/t)<-B$ at any sampling point in the whole sampling period (Yes at Step S15), it is judged that abnormality exists in the image signal OS (Step S16). For example, as shown in FIG. 5, at a sampling point where abnormality does not exist in the image signal OS, the image data level difference $\Delta L$ satisfies $(L_n-L_{n-1})/t \geq -B$, whereas at a sampling point where abnormality exists in the image signal OS, the image data level difference $\Delta L$ satisfies $(L_n-L_{n-1})/t<-B$.

Similar to the first embodiment, if it is judged that abnormality exists in the image signal OS, the effective timing of the sampling pulse CP for inputting the image signal OS to the A/D conversion circuit 9 is advanced by changing the adjustment value of the generation timing of the sampling pulse (Step S18). Thereafter, the flow returns to Step S11 to repeat the adjustment of the generation timing of the sampling pulse CP until abnormality of the image signal OS disappears. The adjustment value when abnormality of the image signal disappears is written in the memory circuit (Step S16) to thereafter terminate the operation.

As described above, according to the second embodiment, the image reading apparatus of the first embodiment shown in FIG. 1 is provided with the image data abnormality detection circuit 21 constituted of the image memory 22, changing rate detection circuit 23 and discrimination circuit 24, and in accordance with the changing rate of the image signal calculated by the changing rate detection circuit 23, the generation timing of the sampling pulse CP is adjusted until the discrimination circuit 24 does not detect abnormality of the image signal OS.

In addition to the technological advantages of the first embodiment, the generation timing of the sampling pulse CP can be automatically performed until the image signal is judged as normal. The work burden required for the adjustment of the generation timing can be mitigated.

OTHER EMBODIMENTS

The image reading apparatus 1 of the first and second embodiments is applicable to the image reading function unit of a facsimile apparatus, a copying machine, a scanner or the like.

The scope of the invention contains also the case wherein software program codes realizing the function of each embodiment described above are supplied to a computer (CPU or MPU) of an apparatus or system connected to various devices realizing the embodiment function, and the computer operates the devices in accordance with the programs stored in the computer to realize the function of the embodiment.

In this case, the software program codes themselves realize the embodiment function. Therefore, the program codes themselves and means for supplying the program codes to the computer, e.g., a storage medium storing the program codes, constitute the present invention. The storage medium for storing such program codes may be a flexible disk, a hard disk, an optical disk, a magneto optical disk, a CD-ROM, a magnetic tape, a nonvolatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

For example, as shown in FIG. 10, the operation of the image reading apparatus of the first and second embodiments can be realized by CPU 1001 with a computer function 1000.

As shown in FIG. 10, the computer function 1000 is realized by CPU 1001, a ROM 1002, a RAM 1003, a keyboard controller (KBC) 1005 for a keyboard (KB) 1009, a CRT controller (CRTC) 1006 for a CRT display (CRT) 1010 as a display unit, a disk controller (DKC) 1007 for a hard disk (HD) 1011 and a flexible disk (FD) 1012, and a network interface card (NIC) 1008, respectively connected by a system bus 1004 for data communication.

CPU 1001 executes software stored in ROM 1002 or HD 1011 or supplied from FD 1012 to collectively control each constituent unit connected to the system bus 1004.

Namely, CPU 1001 reads a processing program for performing the operation described earlier from ROM 1002, HD 1011 or FD 1012 and executes the program to realize the operations of the first and second embodiments.

RAM 1003 serves as the main memory, the work area or the like for CPU 1001.

KBC 1005 controls instructions entered from KB 1009, pointing devices (not shown) and the like.

CRTC 1006 controls the display of CRT 1010.

DKC 1007 controls access to HD 1011 and FD 1012 which store a boot program, various applications, user files, network management programs, the processing programs for the first and second embodiments and the like.

NIC 1008 transfers data bi-directionally to and from another apparatus on the network 1013.

As described so far, the generation timings of drive signals can be adjusted for each image reading apparatus in order to prevent influence of interference upon an output image signal. A drive signal optimum to each image reading apparatus can be generated so that influence such as crosstalks upon an image signal can be prevented. It is therefore possible to prevent an image signal that produces an abnormal image such as a moire image from being output and realize good image reading.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
    a timing adjusting circuit which adjusts a generation timing of a drive signal for driving at least an image pickup element which reads an object image and outputs an image signal of the object image;
    a memory circuit which stores an adjustment value of the generation timing of the drive signal adjusted by said timing adjusting circuit;
    a drive signal generating circuit which generates the drive signal in accordance with the adjustment value stored in said memory circuit;
    a pixel sampling circuit which samples the image signal a plurality of times in one image pickup element;
    a changing rate detection circuit which calculates a changing rate of image signals sampled at adjacent sampling timings, from the image signals sampled by said pixel sampling circuit; and
    a discrimination circuit which judges whether the image signal is normal or not in accordance with the changing rate of the image signal calculated by said changing rate detection circuit,
    wherein in a case that said discrimination circuit judges that the image signal is abnormal, said timing adjusting circuit adjusts the generation timing of the drive signal.

2. An image reading apparatus according to claim 1, wherein said timing adjusting circuit adjusts a relative generation timing of the drive signal.

3. An image reading apparatus according to claim 1, wherein the adjustment value is a difference between a standard generation timing of the drive signal and a generation timing of the drive signal adjusted by said timing adjusting circuit.

4. An image reading apparatus according to claim 1, wherein the drive signal includes an image pickup element drive signal for driving the image pickup element and a sampling signal for sampling the image signal output from the image pickup element.

5. An image reading apparatus according to claim 1, wherein said memory circuit is non-volatile.

6. An image reading apparatus according to claim 1, wherein said timing adjusting circuit repetitively adjusts the generation timing of the drive signal until said discrimination circuit judges that the image signal is normal.

7. An image reading apparatus according to claim 1, wherein said discrimination circuit judges that the image signal is normal, in a case that the changing rate of the image signal is in a predetermined range.

8. An image reading apparatus having a plurality of resolutions for reading an original image, for scanning the original image on a line basis to read the original image composing:
    image pickup elements for photoelectrically converting optical information corresponding to darkness and brightness of the original image and outputting an analog image signal;
    a drive signal generation circuit which generates a plurality of drive signals for supplying a clock signal to respective photosensitive portions of said image pickup elements;
    a digital conversion circuit which converts the image signal into a digital signal by using the drive signals;
    a timing adjusting circuit which relatively changes and adjusts generation timings of the drive signals; and
    a non-volatile memory circuit which stores adjustment values of the generation timings of the drive signals given by said timing adjusting circuit, the adjustment value being a generation timing relative to a standard generation timing of the drive signal,
    wherein when the generation timings are adjusted, the adjustment values of the generation timings of the drive signals adjusted by said timing adjustment circuit are stored in said memory circuit, and
    wherein when the original image is to be read, said drive signal generation circuit is controlled to obtain the image signal, by referring to the adjustment values stored in said memory circuit.

9. An image reading apparatus according to claim 8, wherein when said image pickup elements operate at a highest operation speed among the plurality of read resolutions, the adjustment of the generation timings of the drive signals is selectively performed.

10. An image reading apparatus according to claim 8, further comprising:
- a pixel sampling circuit which samples the image signal a plurality of times in one image pickup element;
- a changing rate detection circuit which checks whether a changing rate between image signals sampled from the image signal at adjacent sampling timings by said pixel sampling circuit is in a predetermined range; and
- a discrimination circuit which judges that the image signal is abnormal, in a case that the changing rate detected by said changing rate detection circuit is out of the predetermined range,
- wherein said timing adjustment circuit is controlled to repetitively adjust the generation timings of the drive signals until said discrimination circuit judges that the image signal is normal.

11. A drive method for an image reading apparatus comprising:

- a timing adjusting step of an adjusting generation timing of a drive signal for driving at least an image pickup element which reads an object image and outputs an image signal of the object image;
- a storing step of storing an adjustment value of the generation timing of the drive signal adjusted in said timing adjusting step;
- a drive signal generating step of generating the drive signal in accordance with the adjustment value stored in said storing step;
- a pixel sampling step of sampling the image signal a plurality of times in one image pickup element;
- a changing rate detection step of calculating a changing rate of image signals sampled at adjacent sampling timings, from the image signals sampled by said pixel sampling step; and
- a discrimination step of judging whether the image signal is normal or not in accordance with the changing rate of the image signal calculated by said changing rate detection step,
- wherein in a case that said discrimination step judges that the image signal is abnormal, said timing adjusting step adjusts the generation timing of the drive signal.

* * * * *